US009169828B2

(12) United States Patent
Mangano

(10) Patent No.: US 9,169,828 B2
(45) Date of Patent: Oct. 27, 2015

(54) METHOD AND DEVICE FOR ELECTRICAL POWER GENERATION FROM WIND POWER AND METHOD OF MANUFACTURE THEREOF

(76) Inventor: Stefano Mangano, Menlo Park, CA (US)

(*) Notice: Subject to any disclaimer, the term of this patent is extended or adjusted under 35 U.S.C. 154(b) by 618 days.

(21) Appl. No.: 13/492,845

(22) Filed: Jun. 9, 2012

(65) Prior Publication Data

US 2013/0156585 A1    Jun. 20, 2013

Related U.S. Application Data

(60) Provisional application No. 61/495,356, filed on Jun. 9, 2011.

(51) Int. Cl.
*F03D 3/06*       (2006.01)
*F03D 3/00*       (2006.01)

(52) U.S. Cl.
CPC .............. *F03D 3/064* (2013.01); *F03D 3/005* (2013.01); *F03D 3/061* (2013.01); *F05B 2240/212* (2013.01); *F05B 2250/25* (2013.01); *Y02E 10/74* (2013.01)

(58) Field of Classification Search
CPC ......... F03D 3/061; F03D 3/062; F03D 3/064; F03D 3/065; F03D 3/005; F03D 2250/15; F03D 2250/25; F03D 2240/212; F05B 2250/15; F05B 2250/25; F05B 2240/212
USPC ...... 416/176–177, 210 R, 210 A, 211, 227 A, 416/227 R, 223 A, 223 R, 242, 243; 415/4.2, 415/4.4, 907
See application file for complete search history.

(56) References Cited

U.S. PATENT DOCUMENTS

| 1,835,018 | A | * | 12/1931 | Darrieus | ................. | 415/224 |
| 2,020,900 | A | * | 11/1935 | Methvin | ................. | 416/227 R |
| 4,115,032 | A | * | 9/1978 | Lange | ................. | 416/227 A |

(Continued)

FOREIGN PATENT DOCUMENTS

| WO | WO 2005010355 A1 | * | 2/2005 |
| WO | WO 2010023648 A2 | * | 3/2010 |
| WO | WO 2011033348 A2 | * | 3/2011 |

OTHER PUBLICATIONS

Klimas, Paul C., "Tailored Airfoils for Vertical Axis Wind Turbines", Feb. 1992, Sandia National Laboratories, pp. 5-6.*

*Primary Examiner* — Dwayne J White
*Assistant Examiner* — Alexander White
(74) *Attorney, Agent, or Firm* — Patrick Reilly

(57) ABSTRACT

A method and system are provided for converting wind power into electrical energy. One or more blades are attached by one or more struts to a vertical or central shaft, wherein each strut mechanically couples at least one of the blades to the shaft. One or more blades may be laminar. An optional method of fabricating a wind turbine blade, or fluid turbine blade, wherein the blade may be manufactured by a pultrusion process; may present a constant blade twist along a central axis of the blade itself; and/or may present a cross-section along the blade central axis. Alternatively or additionally, an airfoil is provided may be laminar and/or uncambered. According to a still additional optional aspect of the method of the present invention, a Darrieus-type vertical-axis wind turbine is provided, the turbine having a shaft that defines a rotation axis with a plurality of substantially rigid blades.

13 Claims, 19 Drawing Sheets

(56) References Cited

U.S. PATENT DOCUMENTS 5,531,567 A * 7/1996 Hulls .............................. 416/87
2010/0253081 A1 * 10/2010 Schlabach et al. .............. 290/54
2012/0070294 A1 * 3/2012 Gorlov .......................... 416/203
2012/0269627 A1 * 10/2012 Grahame ........................ 416/13

* cited by examiner

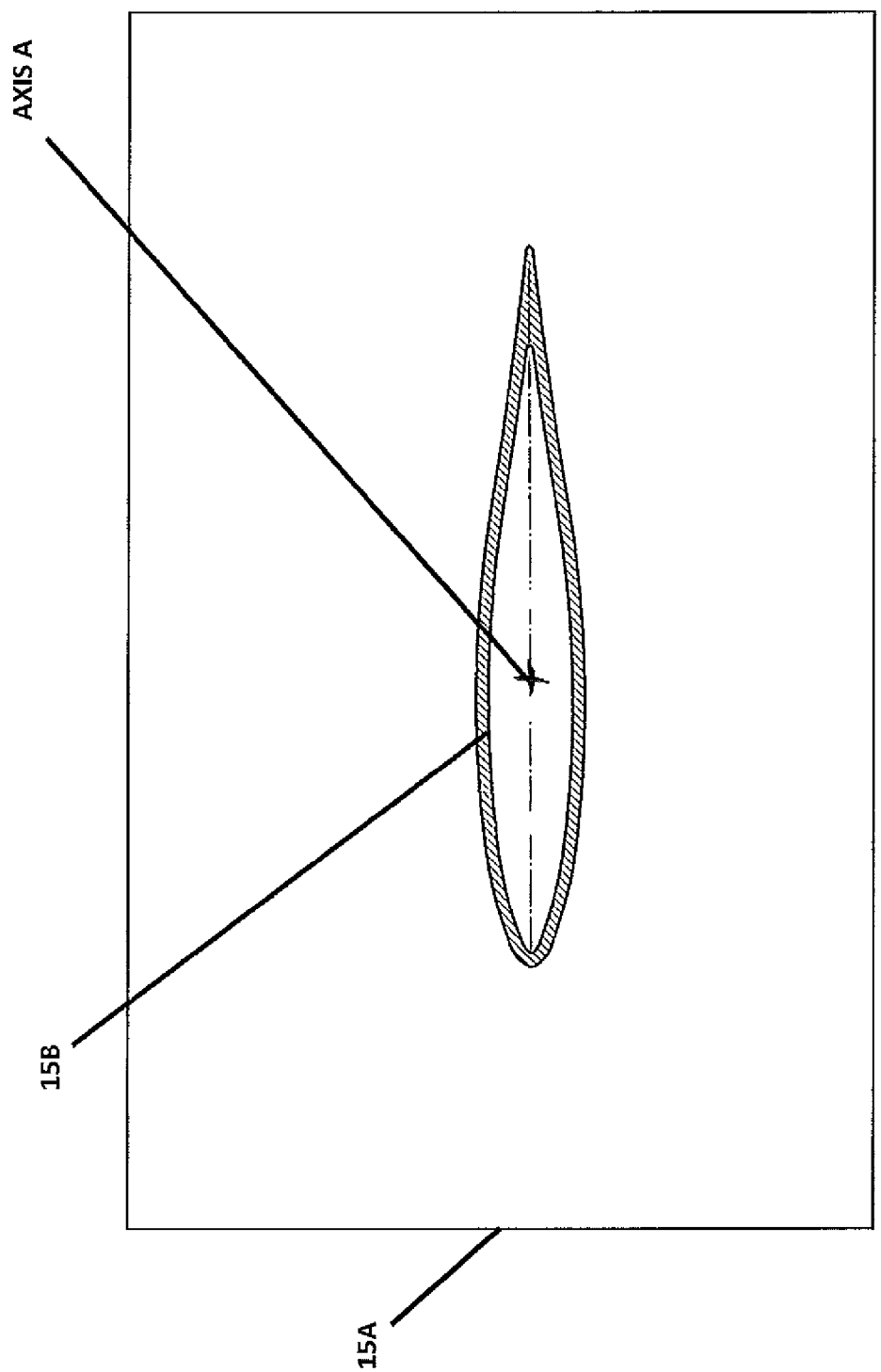

METHOD AND DEVICE FOR ELECTRICAL POWER GENERATION FROM WIND POWER AND METHOD OF MANUFACTURE THEREOF

PATENT APPLICATIONS

This Nonprovisional Patent Application is a Continuation-in-Part Application to Provisional Patent Application Ser. No. 61/495,356, filed on Jun. 9, 2011 and titled "METHOD AND DEVICE FOR ELECTRICAL POWER GENERATION FROM WIND POWER AND METHODS OF MANUFACTURE THEREOF". Provisional Patent Application Ser. No. 61/495,356 is hereby incorporated by reference in its entirety and for all purposes, to include claiming benefit of the priority date of filing of Nonprovisional Patent Application Ser. No. 61/495,356.

BACKGROUND OF THE INVENTION

The prior art provides systems and methods of use thereof for the purpose of generating electrical energy from atmospheric wind power. U.S. Pat. No. 5,405,246 (hereinafter, "Goldberg") discloses a vertical-axis wind turbine that includes two or more elongated blades connected to a rotor tower. Goldberg teaches that the tower defines an axis of rotation and is linked, preferably via a gearbox or other torque-converting arrangement, to the shaft of a generator. Each of Goldberg's blades are "twisted" so that each blade has a lower attachment point that is displaced angularly relative to an upper attachment point of the same blade. In a preferred embodiment of Goldberg, the radial distance of each blade from the axis of rotation varies between upper and lower attachment points such that the blade lies approximately along a "troposkein", i.e., the shape that is assumed by a string clamped at each end and spun about an axis passing through the ends of the string. The ratio between blade chord length and blade thickness is preferably constant over the length of each blade of Goldberg's device, with the middle of each blade being approximately 80% as thick as its ends. Goldberg teaches that the cross-section of one or more blades may be teardrop-shaped, shaped as an airfoil, rectangular, or curved in some other way.

International Patent Application PCT/GB2004/003257, or WIPO Patent Application Publication No. WO/2005/010355, (hereinafter, "Cochrane"), discloses a vertical axis wind turbine comprising a rotatable shaft formed about a longitudinal axis and a plurality of substantially rigid blades mechanically coupled to the shaft, wherein each of the plurality of blades comprises an elongate body having an upper end and a lower end, and the upper end and the lower end of each blade are rotationally off-set from each other about the longitudinal axis such that each blade has a helix-like form. Furthermore, Cochrane teaches that sections of an elongate body of each blade, taken perpendicularly to the longitudinal axis, are shaped as an aerofoil having a leading edge and a trailing edge. The blade of Cochrane presents a camber line defined between the leading edge and the trailing edge, wherein the disclosed aerofoil is arcuately shaped such that each blade camber line lies along a line of constant curvature having a finite radius of curvature.

International Patent Application PCT/GB2008/001151, or WIPO Patent Application Publication No. WO/2008/119994 (hereinafter, "Bertenyi") discloses a wind turbine system that includes a wind turbine; a regenerative drive system; a wind-speed sensor for measuring local wind speed; and a controller. The wind turbine comprises a motor-generator system, which is operatively connected to the regenerative-drive system. The motor-generator system is both (a.) drivable as a motor by the regenerative drive system to increase a rotational speed of the wind turbine; and (b.) operable as a generator by the regenerative drive system to decrease a rotational speed of the wind turbine. The system controller is operatively connected to the wind-speed sensor and the regenerative drive system, wherein the controller is operable to control operation of the regenerative-drive system to thereby control the rotational speed of the wind turbine in response to signals received from the wind sensor indicative of gusting changes in the local wind speed.

Yet the methods of the manufacturing of blades for wind turbine systems remain an economic burden on the cost-effective deployment of wind turbines, and the prior art designs of wind turbine blades fail to optimally address the variety of needs and preferences of the public and of industry. There is therefore a long-felt need for improved methods of wind turbine manufacture, wind turbine design, and methods of use thereof.

SUMMARY OF THE INVENTION

Toward these and other objects that are made obvious in light of the disclosure, a method and system are provided for converting wind power into electrical energy. According to a first aspect of the present invention, a blade is provided that is attached to a rotatable shaft by a strut.

According to a second optional aspect of the method of the present invention, one or more blades are attached by one or more struts, wherein each strut mechanically couples at least one of the blades to a same rotatable shaft. Alternatively or additionally, the airfoil of one or more blades may be laminar.

The method further provides an optional method of fabricating a wind turbine blade, or fluid turbine blade, wherein the blade may be manufactured by a pultrusion process; may present a constant blade twist and bend in two planes simultaneously along a central axis of the blade itself; and/or may present a cross-section along the blade central axis such that if the blade is dividable into two or more parts, wherein at least two equal parts has the same, or substantively similar or identical, shape and dimensions.

According to yet another optional aspect of the present invention, an uncambered airfoil may be coupled with a rotatable shaft or, alternatively, with a non-rotatable shaft. Alternatively or additionally, the airfoil may be laminar. Further alternatively or additionally, for a high solidity rotor, cambered blades can be included or employed in yet other alternate preferred embodiments of the present invention to improve the aerodynamic performance of a wind turbine or a fluid turbine.

It is understood that improving the lift of one or more struts might have no effect on performance of a blade or a comprising turbine, but might help compensate for downward gravitational force. The effect on stress distribution would preferably be examined and verified in various alternate preferred embodiments of the present invention. Another effect of cambered struts in certain alternate embodiments of the method of the present invention might be to increase the drag of, or drag force experienced by the struts, to assist the starting of the turbine at low wind speed.

According to a still additional optional aspect of the method of the present invention, a Darrieus-type vertical-axis wind turbine is provided, the turbine having a shaft that defines a rotation axis with a plurality of substantially rigid blades. One or more blades have a lower and upper end wherein a blade path extending from the lower end to the upper end of a same blade represents the trajectory along which the cross-section of the blade must travel in order to generate the full body of the blade.

The location of an intersection of the cross-section of the blade with the blade path may alternatively be substantially constant along the path. The cross-section of one or more blades, taken perpendicularly to a blade path of a selected blade, may be shaped as an airfoil that defines a leading edge; a trailing edge; a chord length; a blade thickness; and a maximum blade thickness location. The chord length, chord thickness and maximum thickness location may be substantially constant along the blade path. The maximum thickness location may preferably be approximately in the range of from 30% to 50% of the chord length measured from the leading edge of a same blade. It is understood that a blade having a maximum thickness location presenting a thickness in the range of approximately 30% to 50% of the chord length of the instant or said blade might comprise or include a turbulent airfoil. The upper end of one or more blades may be azimuthally offset about the rotation axis relative to the lower end of a same blade such that each of the conforming blades has a helical shape. It is understood that the method of the present invention alternatively provides for a radial offset of the reference axis from the rotation axis, which results in a variable blade pitch along the length of the blade.

The blade pitch, of certain still alternate preferred embodiments of the method of the present invention, may be defined herein as formed by a leading edge of a blade in relation to a wind direction. For certain other alternate preferred embodiments of the method of the present invention that comprise, or are comprised within, a vertical-axis wind turbine, the blade pitch of a certain blade may alternately be defined as the angle between that certain blade's chord line (or chord length direction) and the tangential direction (or rotation direction or rotation path or orbital path) of that certain blade, and measured at the aerodynamic center of that certain blade.

Optionally and additionally, one or more substantially rigid struts each mechanically couples at least one of the blades to a centrally positioned shaft. The cross-section of one or more of the struts, taken perpendicularly to a radial direction, may be shaped as an airfoil with a maximum thickness location formed preferably at approximately within the range of from 40% to 50% of the chord length measured from the leading edge of a same blade.

As noted above, it is understood that a blade having a maximum thickness location presenting a thickness in the range of approximately 30% to 50% of the chord length of the instant or said blade might comprise or include a turbulent airfoil. However, a blade presenting a laminar cross-section could generate less drag for a zero angle of attack and would be also preferable for struts in certain alternate variations of the method of the present invention.

According to yet another optional aspect of the method of the present invention, a radial distance of one or more blades in reference to a rotation axis varies along the blade path and approximates a circular arc, wherein the radial distance at approximately the middle of the path may be longer than at the ends of a same blade. The lower and upper ends of one or more blades are offset such that the conforming blade or blades twists. Additionally the blade twist of at least one blade may be constant along the length of the relevant and conforming blade. A blade twist of one or more blades may vary based on a desired azimuthal offset from a particular blade path about a rotation axis, and the same blade bend may vary based on a desired radial distance between a rotation axis and the blade's path. The blade bend of a blade is defined herein as the flexion of the blade path in the direction (or radial direction) of the axis of rotation of the blade.

According to an even additional optional aspect of the method of the present invention, a lower end and an upper end of each of a blade may be connected to a shaft. The body of one or more struts coupling at least one blade to a shaft may be contained within a geometric plane perpendicular to a rotation axis and aligned along a shortest line defined between the blade and the shaft.

BRIEF DESCRIPTION OF THE FIGURES

The method of the present invention relates to vertical-axis wind or fluid turbines used for electricity or torque production. The aspects of the method of the present invention will now be described with reference to the accompanying drawings in which:

FIG. 14C is a front view of an exemplary blade die of the die module of FIG. 14B;

DETAILED DESCRIPTION

It is to be understood that this invention is not limited to particular aspects of the present invention described, and as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
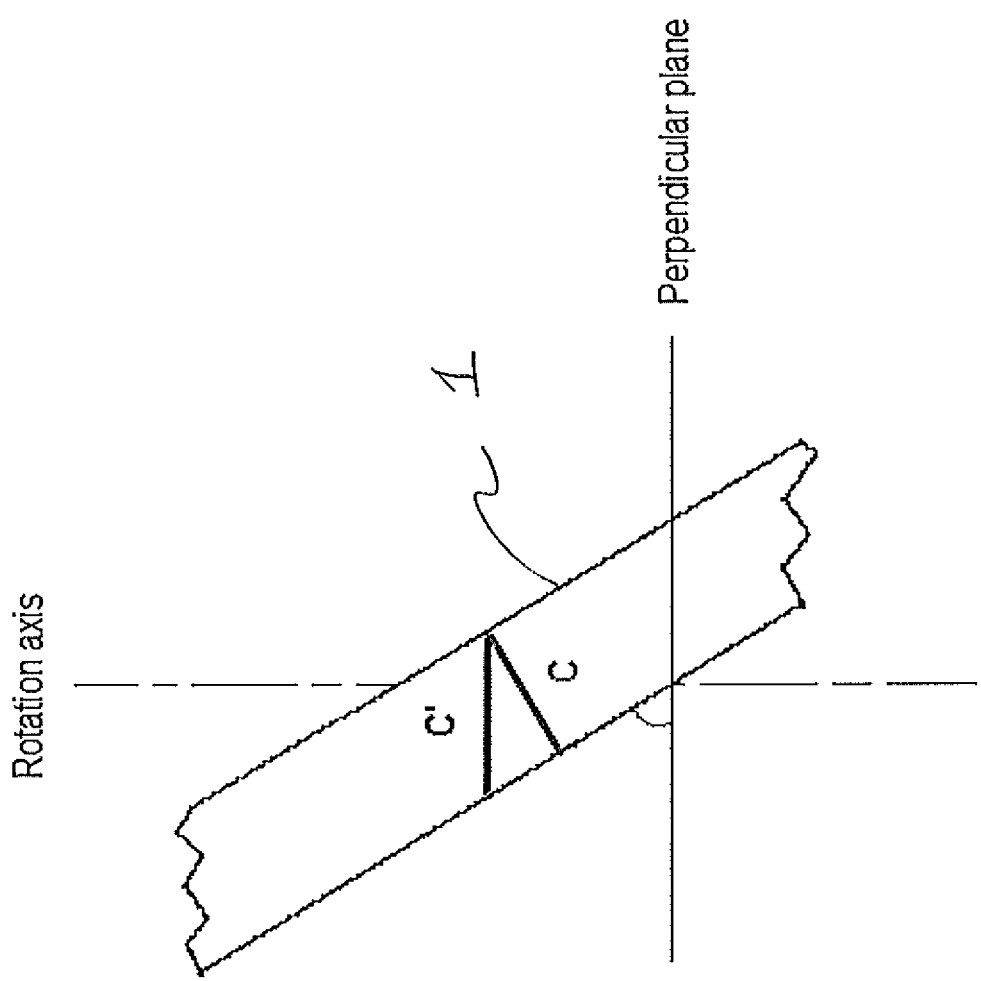
FIG. 1 is an illustration of a detail of an invented turbine blade wherein a chord length (c) and an apparent chord length (c') are represented.

Referring now generally to the Figures and particularly to FIG. 1, FIG. 1 is an illustration of a detail of an invented turbine blade 1 wherein a chord length (c) and an apparent chord length (c') are represented.

Figure 2:
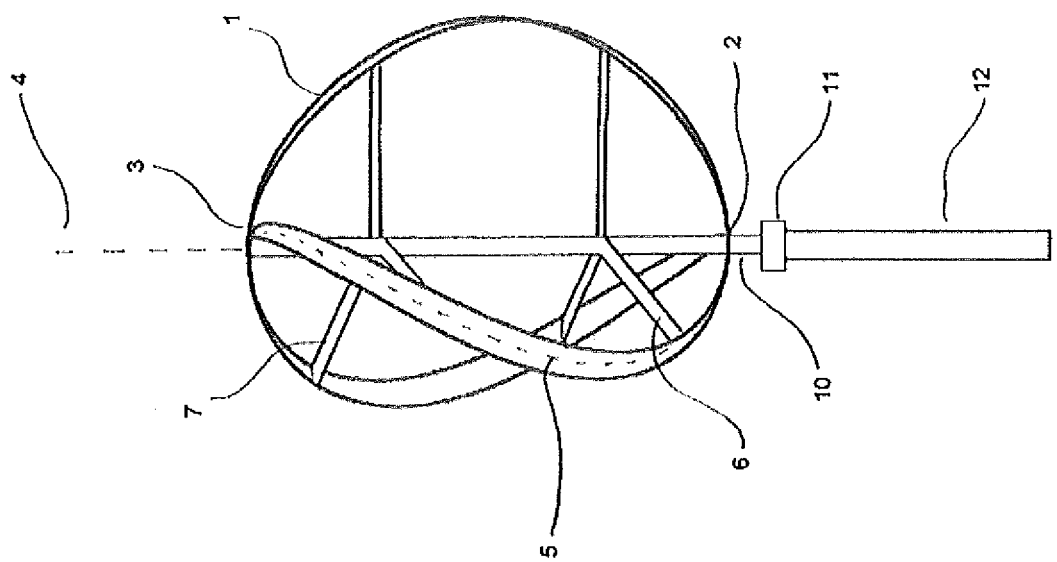
FIG. 2 is a schematic illustration of an invented vertical-axis wind turbine with a plurality of helical blades of FIG. 1.

FIG. 2 shows the general configuration of a vertical-axis wind turbine T according to a first configuration of the invention. This vertical-axis wind turbine T includes a shaft 10 defining a rotation axis 4, a plurality of substantially rigid blades 1, each of the blades 1 defining a lower end 2 and an upper end 3, a path 5 extending from the lower end 2 to the upper end 3. The blades 1 travel on a path 5 comprising the trajectory along which the cross-section of the blade 1 must travel in order to generate the body of the blade 1. The location of the intersection of the cross-section of the blade 1 with the path 5 is substantially constant along the path 5. The upper end 3 of each of the blades 1 is azimuthally offset about the rotation axis 4 relative to the lower end 2 such that each of the blades 1 has a helical shape.

It is understood that dimensions of the shaft 10, in certain yet alternate embodiments of the method of the present invention, comprise a linear tube presenting an outer diameter of 7", an inner diameter of 6.625" and a length of 273.2" long determined by the geometry and area of the turbine and aerodynamic loads generated during its operation. It is understood that the outer diameter, the inner diameter, and the length of the shaft 10 of various alternate preferred embodiments are selected and altered to attempt to meet performance goals in light of situation specific parameters, expectations and/or ranges of (a.) loads; (b.) desired power output; (c.) fluid or wind environments; (d.) turbine designs or turbine design goals; and/or (e.) external factors or expectations thereof.

Additionally, optionally or alternately, the shaft 10 might comprise pultruded carbon fiber with or without glass fiber, nano tubes, aluminum or carbon steel.

The use of helical blades in a vertical-axis wind turbine can possibly (a.) reduce the aerodynamic loads amplitude applied on the turning blades; and/or (b.) evidence torque variations that could increase the expected lifespan of the turbine and reduce the aerodynamic noise levels. Moreover, the use of helical blades in a vertical-axis wind turbine can improve the aesthetic of the turbine, making the turbine more acceptable in urban and rural environments.

In a first preferred configuration, the radial distance from the blades 1 to the rotation axis 4, measured along the path 5, approximates a circular arc with the maximum radial distance approximately at the middle of the of each blade 1 and the center of curvature of the circular arc lies along the rotation axis 4. The lower end 2 and upper end 3 of each of the blades 1 are connected to the shaft 10 for additional mechanical strength. In still other configurations and alternate aspects, the center of curvature needs not lie within, on, or proximate to the rotation axis 4.

Figure 5:
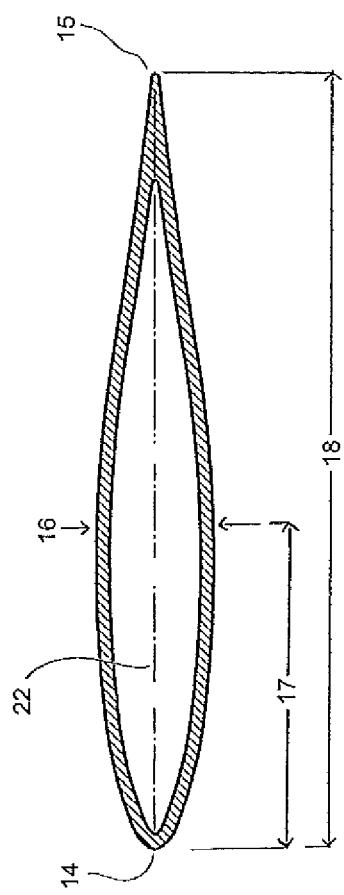
FIG. 5 is a cross-sectional view of an optional cross-sectional profile of either the blades and struts of FIGS. 1 through 4 and according to the method of the present invention.

As shown in FIG. 5, the cross-section of the body of each of the blades, taken perpendicularly to the path 5, is shaped as an airfoil, defining a leading edge 14, a trailing edge 15, a chord length 18, a thickness 16 and a maximum thickness location 17. The thickness 16 is defined as the maximum thickness of the cross-section. The chord length 18 is measured as the shortest distance between the leading edge 14 and the trailing edge 15. In the case of a symmetrical airfoil, the shortest distance between the leading edge 14 and the trailing edge 15 is measured along the symmetry axis 22.

In a preferred aspect, the blade chord length, thickness and maximum thickness location of the blade 1 is substantively constant along the path 5. The blade thickness 16 varies within 15% to 21% of the blade chord length 18 and the blade chord length 18 varies within 6% to 12% of the maximum rotor radius. The maximum thickness location 17 varies within 40% to 50% of the blade chord length 18 measured from the leading edge 14. Such profiles are currently referred as laminar airfoils. Examples of such airfoils are the SNLA airfoil developed by Sandia National Laboratories (New Mexico). Laminar airfoils offer a lower resistance to wind, which can increases the aerodynamic performance of a vertical-axis wind turbine. Other families of laminar airfoils can also be used, including cambered laminar airfoils, wherein the axis of symmetry 22 of the cross-section doesn't lie along the line of the shortest distance between the leading edge 14 and the trailing edge 15.

Figure 7:
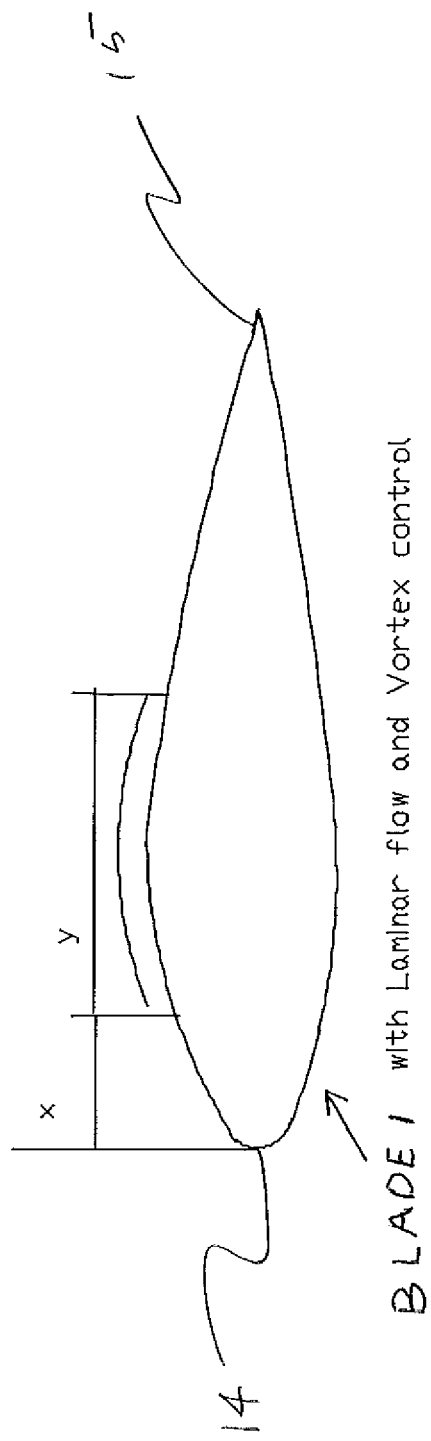
FIG. 7 is an illustration of a variation of the blades of FIGS. 1 through 5 that is in accordance with claim 7.

FIG. 7 is an illustration of a variation of the blades of FIGS. 1 through 5 that is in accordance with claim 7.

Figure 8:
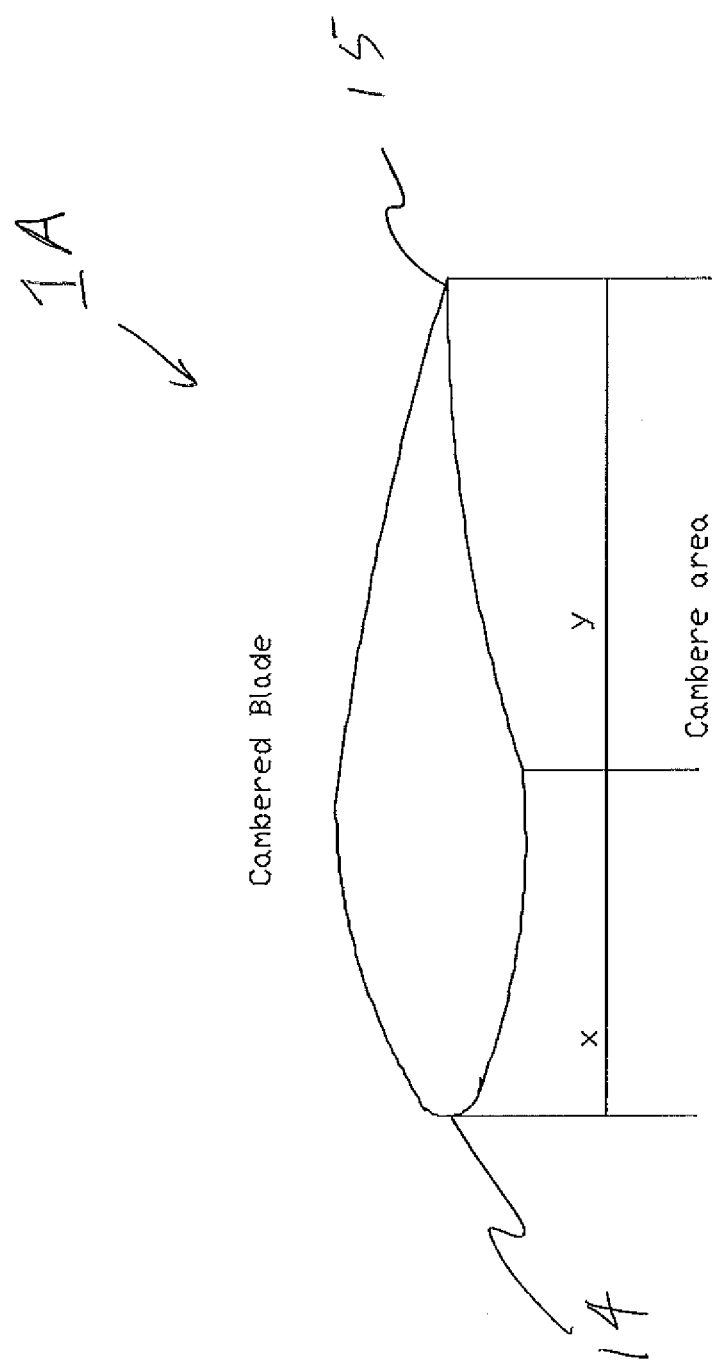
FIG. 8 is an illustration of a variation of the blades of FIGS. 1 through 5 and FIG. 7 that is in accordance with claim 8.

FIG. 8 is an illustration of a variation 1A of the blades 1 of FIGS. 1 through 5 and FIG. 7 that is in accordance with claim 8.

Figure 9:
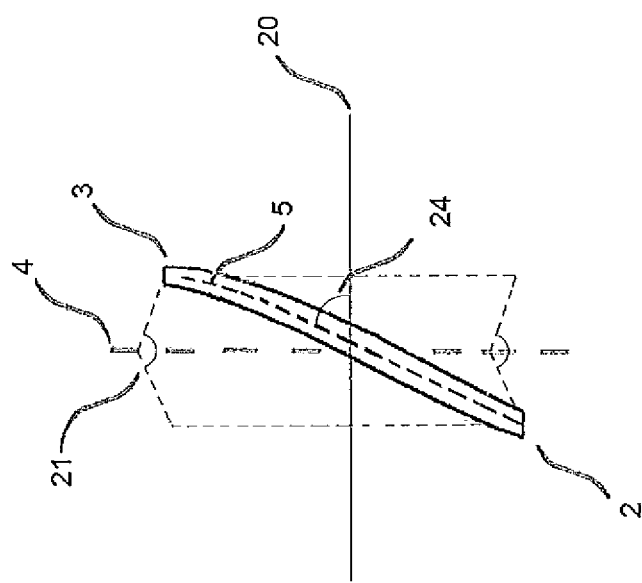
FIG. 9 is an illustration of a schematic illustration of the blade azimuthal offset and blade inclination of the blades of FIGS. 1 through 5, FIG. 7 and FIG. 8.

As shown in FIG. 9, the azimuthal offset 21 about the rotation axis 4 can be in the same direction as the rotation of the blades or counter-rotating without affecting the aerodynamic performance of the rotor, but all the blades must have the same azimuthal offset direction. The azimuthal offset 21 is selected based on the preferred blade inclination 24, the blade inclination 24 is defined as the angle between the path 5 and a perpendicular plane 20 to the rotation axis 4. The blade inclination 24 is inversely proportional to the azimuthal offset 21. The maximum blade inclination depends of the number of blades and is limited conditionally on the requirement that the body of a blade must not cross the body of another blade. In a preferred aspect, the blade inclination 24 of each of the blades 1 is equal or greater than 45 degrees and slighter than 90 degrees.

Referring now generally to the Figures, and particularly to FIGS. 9, 10, 14A and 14B. The blade twist with respect to the blade bend along the path is substantially constant, allowing the production of the blades using a pultrusion process.

Figure 10:
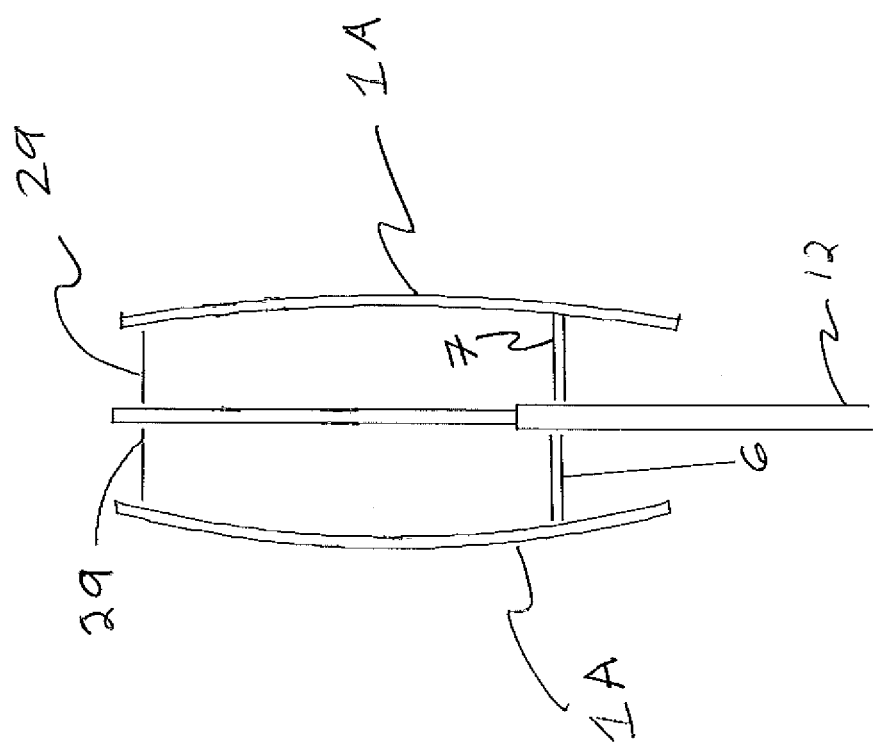
FIG. 10 is an illustration of a variation of the blades of FIGS. 1 through 5 and FIGS. 7 through 9 that is in accordance with claim 13.

In other aspects, the blade twist with respect to the blade bend needs not to be substantially constant over the path. Additionally the lower and upper end of each of the blade 1 needs not to be connected to the shaft 10. Furthermore, as shown in FIG. 2 and FIG. 10, the present invention may include a plurality of substantially rigid struts 6 & 7 mechanically coupling each of the blades 1 to the shaft 10, transmitting the mechanical power produced by the turning blades 1 to the generator 11. A plurality of blade ties 29 may additionally and separately couple each blade 1 to the shaft 10.

The shaft 10 can be connected to the generator 11 directly or indirectly at the lower end of the shaft 10, for example by using a transmission system or gearbox. The shaft 10 extends along the rotation axis 4 from the generator 11 (or transmission system) to at least, the upper struts 7 and rotates along with the blades 1. The generator 11 converts the mechanical power transmitted by the shaft 10 into electrical power and is located at the lower end of the shaft 10, at a height equal or lower than the lower strut 6. The tower 12, generally extending vertically under the generator 11, elevates the generator 11 and the rotor composed of each of the blades 1, each of the struts 6 & 7 and shaft 10, a distance from the ground. The tower 12 also support and maintain the generator 11 and rotor in the desired location and position. The height of the tower 12 may be varied and chosen according to the criteria used to determine the height of conventional vertical-axis wind turbine rotors. Factors to consider include the aesthetic and the physical characteristics of the wind at the location of the vertical-axis wind turbine.

In a preferred aspect, the shaft 10 is connected directly to the generator 11 without the use of a transmission system in order to reduce the power loss related to the transmission system (e.g. due to the friction between the interacting components). If the invention is intended for torque production (e.g., water pumping) instead of electricity production, a generator 11 is not required and the use of a gearbox or other transmission system can be included. The shaft 10 can also extend within the top of the tower 12 and be coupled to the tower 12, preferably via the use of a bearing system.

Figure 6:
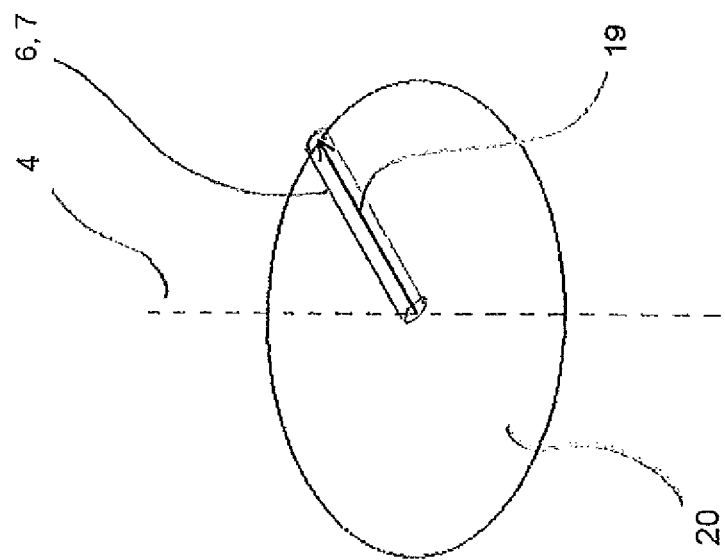
FIG. 6 is a schematic illustration of a strut of FIGS. 2 through 5 and a path of motion of the strut.

The inclusion of struts 6 & 7 provides sufficient mechanical strength to each of the blades 1. As shown in FIG. 6, in a preferred aspect, the body of the struts 6 & 7 are contained within a perpendicular plane 20 to the rotation axis 4 and aligned along the radial direction 19 to minimize the perturbation to the wind flow passing through the rotor and the wind resistance of the struts 6 & 7. The struts chord length is equal or smaller than the blades chord length and the struts thickness is equal or smaller than the blades thickness.

Each of the blades 1 and struts 6 & 7, the shaft 10 and tower 12 may be made of any material or combination of materials that have sufficient resistance to fatigue failure for the expected lifespan of the vertical-axis wind turbine and need not be manufacture of the same material. Composite glass or carbon fiber, laminate materials, woods and metals are example of suitable materials. For the tower 12, concrete materials can also be suitable.

The number of blades, blade length, inclination and cross-section should be selected primarily based on the desired power or torque output at specific wind speeds and rotational speeds, depending of the purpose of the turbine. The number of struts, cross-section and locations of the struts along the height of the shaft should be selected primarily in order to provide sufficient fatigue strength to each of the blade while minimizing the wind resistance and wind flow perturbation. The diameter of the shaft and tower should be selected primarily in order to provide sufficient fatigue strength to resist the total aerodynamic loads applied on the rotor, while minimizing the wind flow perturbation. A typical shaft diameter varies within 3% to 10% of the rotor diameter. Further there should be two struts per blade, typically located approximately at 25% and 75% of the rotor height. Experimental setups and numerical simulations can be used to determine the best geometric values.

Figure 3:
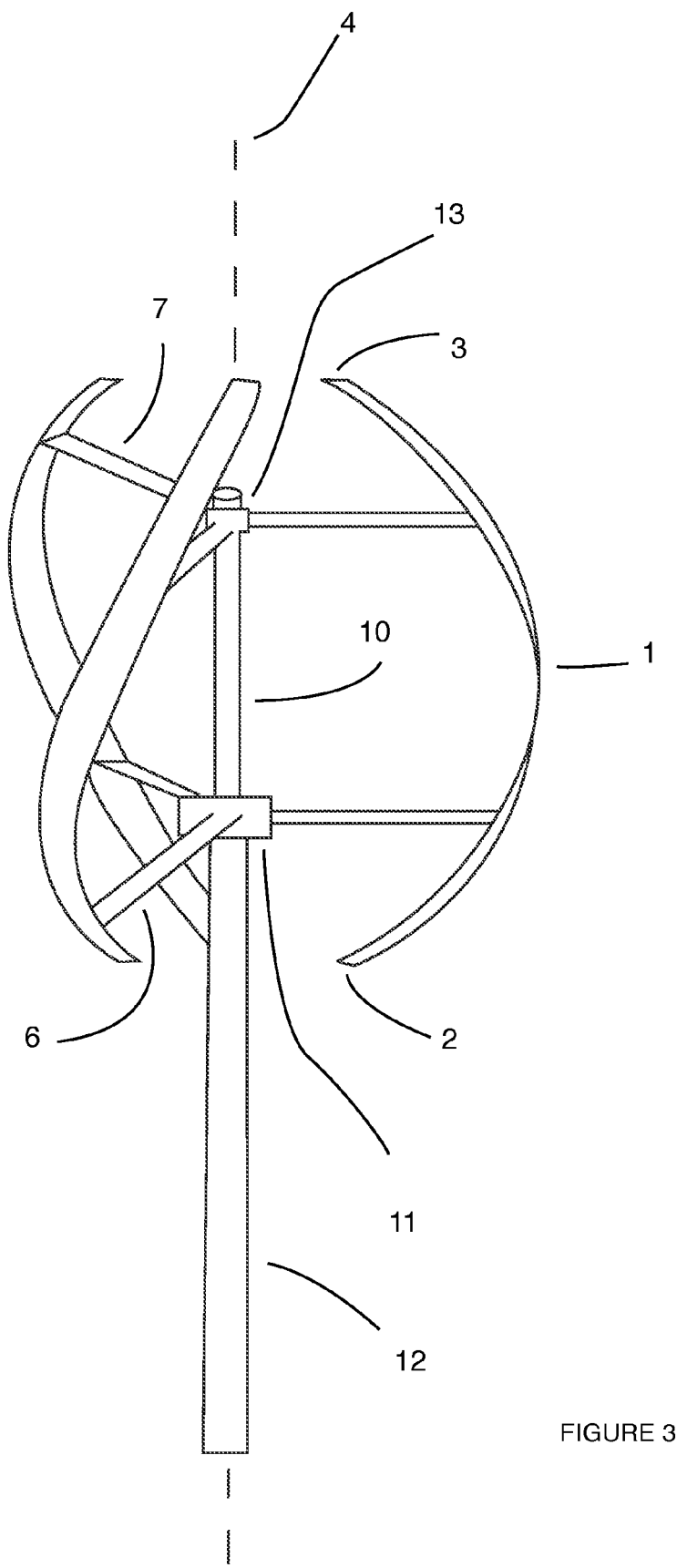
FIG. 3 is a schematic illustration of an advantageous aspect of the invention with the end of the helical blades of FIGS. 1 and 2 not connected to the shaft of FIG. 2.

FIG. 3 shows an advantageous optional aspect of the invention in a second configuration T2, wherein the lower end 2 and upper end 3 of the blades 1 are not connected to the shaft 10 and the shaft 10 is non-rotatable about the rotation axis 4. The upper struts 7 are coupled to the shaft using a bearing system 13 and the lower struts 2 being connected directly to the generator 11. In such configuration, at least the lower, upper or any other struts, if more than two struts per blade are used, must be connected to the generator 11, the other struts being connected to the shaft 10 using a bearing system.

Figure 4:
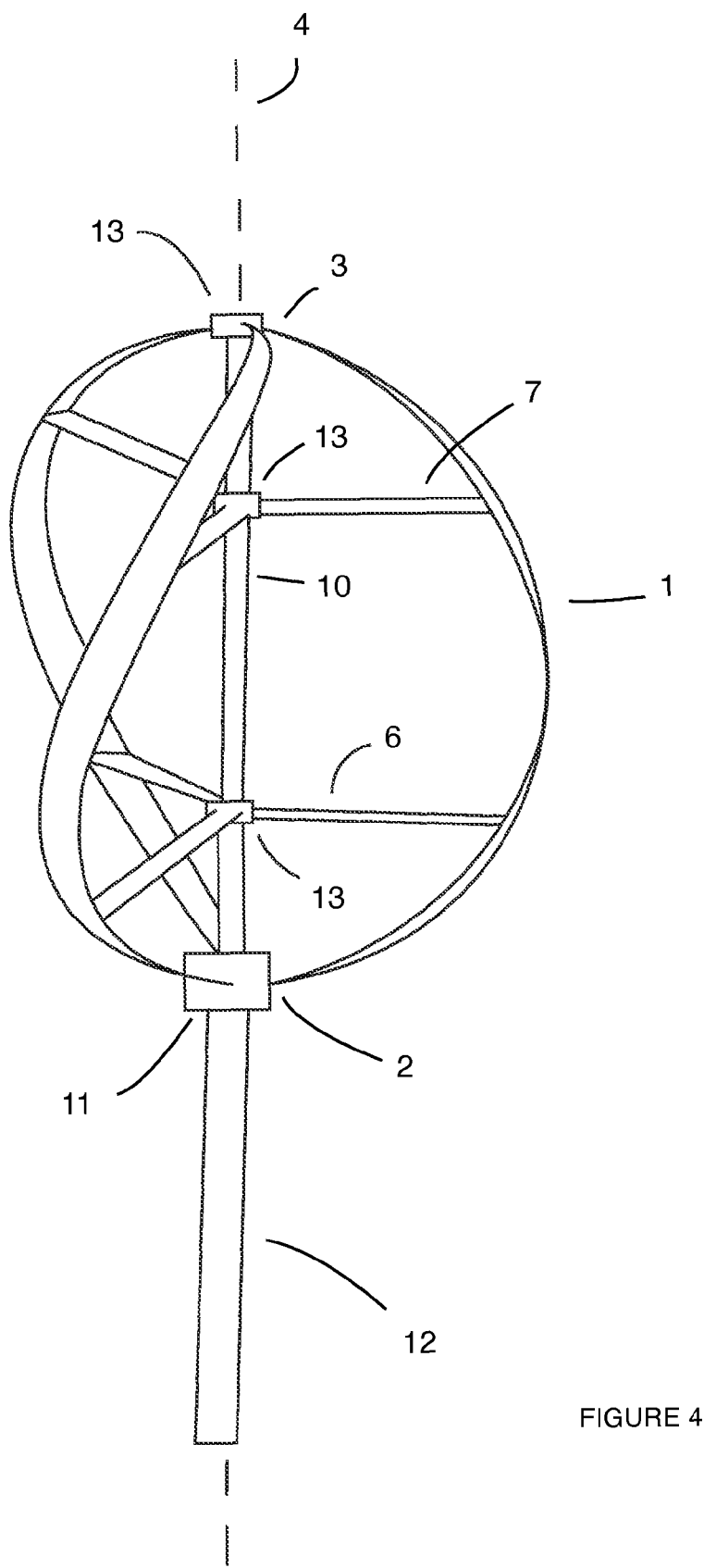
FIG. 4 is a schematic illustration of an advantageous aspect of the invention wherein the end of the blades of FIGS. 1, 2 and 3 are connected to the shaft of FIGS. 2 and 3.

FIG. 4 shows an additional third configuration T3 wherein the upper end 3 of each of the blades 1 and all of the struts 6 & 7 are connected to the non-rotatable shaft 10 via the use of a bearing system 13. The lower end 2 of the blades 1 is connected directly to the generator 11. In such configuration, the generator 11 could also be located at the upper end 3 of the blades 1 or at the height of any of the struts, the blades ends and struts not connected to the generator 11, being connected to the shaft via a bearing system 13.

In FIGS. 2, 3 and 4, three-bladed vertical-axis wind turbine configurations T, T2 & T3 are illustrated. Two blades 1 are sufficient to produce torque and power, but three blades 1 usually provide a good compromise between higher performance and lower manufacturing cost due to the number of blades 1 to manufacture. Other number of blades 1 can also be used. The blades 1 should be disposed with equal azimuthal spacing about the rotation axis to reduce the gyroscopic imbalance.

Furthermore, in FIGS. 2, 3 and 4, two struts 6 & 7 per blade 1 are illustrated. Two struts 6 & 7 per blade 1 is usually sufficient to insure sufficient mechanical strength to each of the blades 1, other number of struts 6 & 7 can also be used, but increasing the number of struts 6 & 7 also increases the amount of wind flow resistance, reducing the amount of torque and power generated. Also the body for each of the struts is contained within a plane perpendicular to the rotation axis, but the blade 1 and shaft 10 connections of each of the struts 6 & 7 need not to be contained within the same perpendicular plane for aesthetic purpose, for example X-shaped struts could be used to enhance the aesthetic of the comprising wind turbine T, T1, T2, T3,T4 & T5.

Moreover, the struts chord length and thickness can vary along the radial direction. Also, as illustrated in FIGS. 2, 3, 4, and 13, the cylindrical shaft 10 and tower 12 are represented, but different geometries can be selected based on aesthetic: a conical shape pointing upward could be used in order to enhance a tree-like appearance. This optional aesthetic design of the tree-like appearance provided in accordance with the method of the present invention is especially well-suited for urban and rural applications as for traffic and parking lighting or for rooftop installation.

FIG. 10 is an illustration of a variation of the blades 1A of FIGS. 1 through 5 and FIGS. 7 through 9 as comprised within a fourth alternate wind turbine T4.

Figure 11:
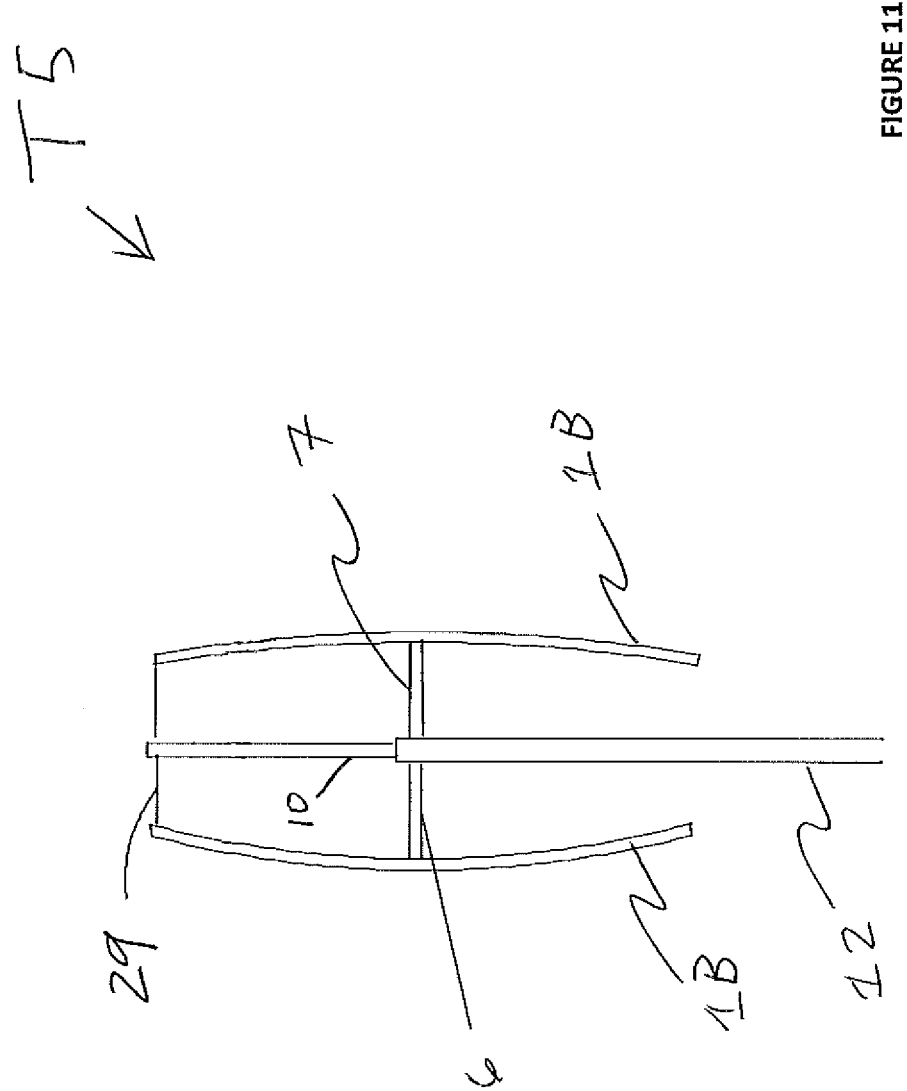
FIG. 11 is an illustration of an additional variation of the blades of FIGS. 1 through 5 and FIGS. 7 through 10 that is in accordance with claim 13.

FIG. 11 is an illustration of an additional variation of the blades 1B of FIGS. 1 through 5 and FIGS. 7 through 10 as comprised within a fourth alternate wind turbine T5.

Figure 12:
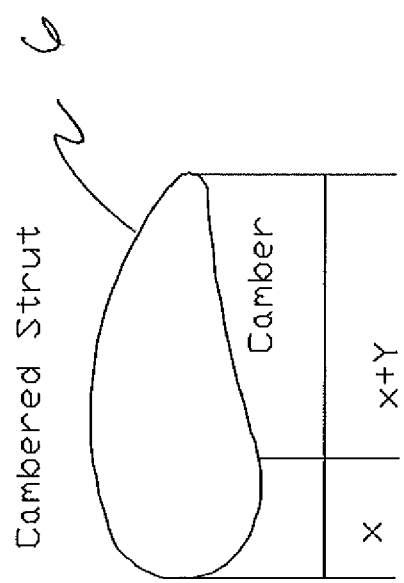
FIG. 12 is a schematic illustration of an alternate cross-section of the strut of FIGS. 2 through 6, FIG. 10 and FIG. 11.

FIG. 12 is a schematic illustration of a cambered strut 6 & 7 of FIGS. 2 through 6, FIG. 10 and FIG. 11.

Figure 13:
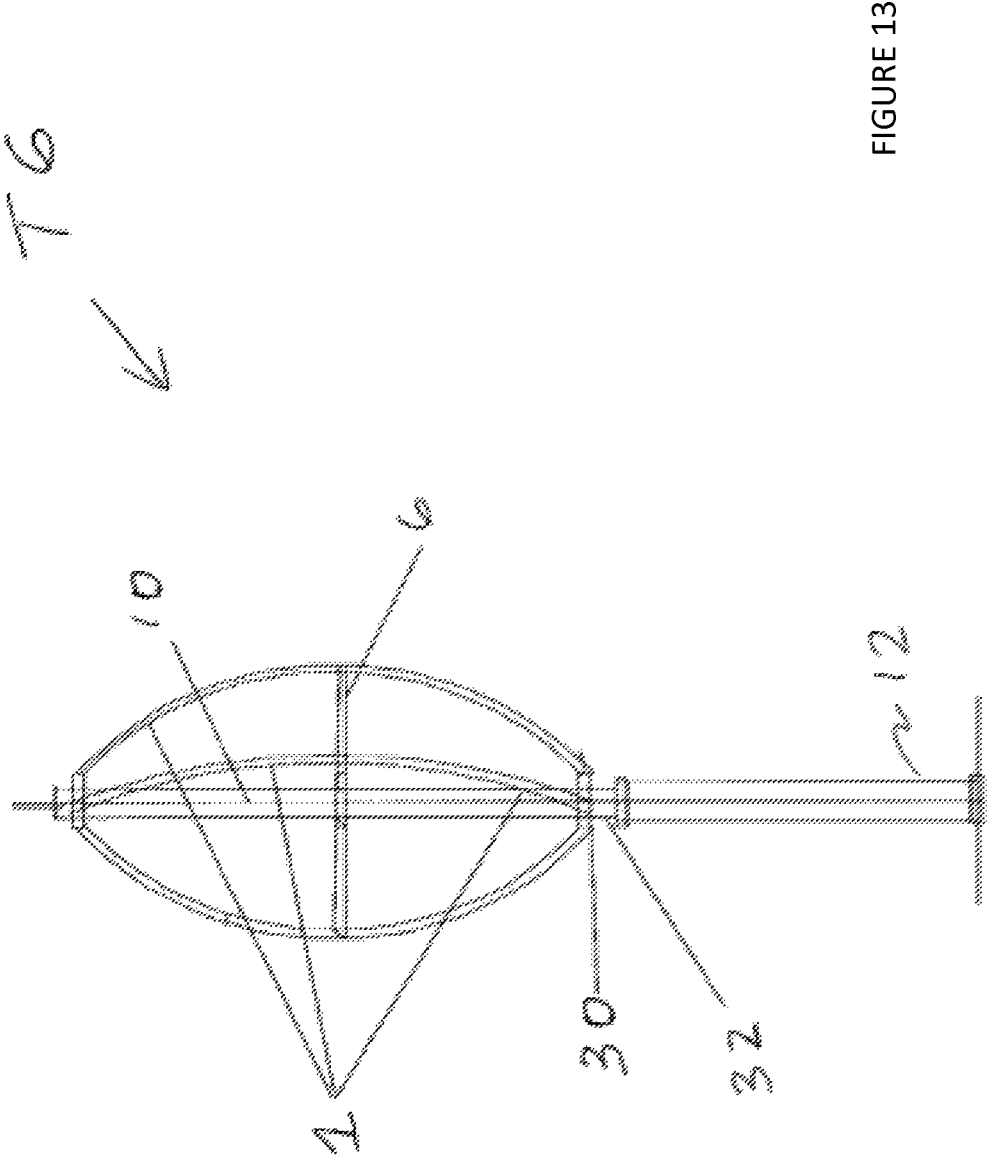
FIG. 13 is an illustration of a variation of a wind turbine that is coupled to an electrical power generator.

FIG. 13 is an illustration of a variation of a wind turbine T1 that is coupled to an electrical power generator assembly 30 and a rotating shaft 32.

Figure 14A:
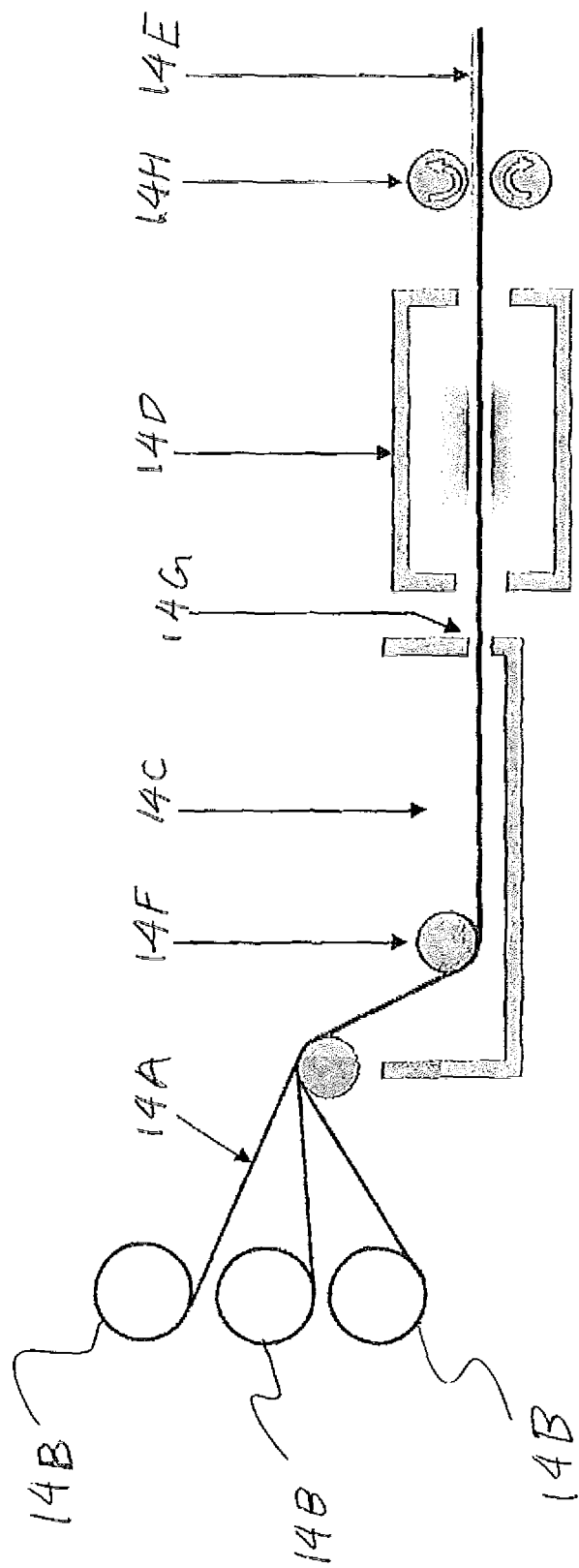
FIG. 14A is a schematic diagram of an equipment set and process for fabricating a blade FIGS. 1 through 5 or 7 through 11 by a pultrusion process in accordance with the method of the present invention.

FIG. 14A is a schematic diagram of an equipment set for fabricating a turbine blade 1 in accordance with the method of the present invention by a pultrusion process FIGS. 1 through 5 or 7 through 11. Pultrusion is a continuous process for manufacture of composite materials with constant cross-section. Reinforced fibers are pulled through a resin, possibly followed by a separate preforming system, and into a heated die, where the resin undergoes polymerization. Many resin types may be used in pultrusion including polyester, polyurethane, vinylester and epoxy.

It is understood technology enabling the invented method is not limited to thermosetting polymers, and further that pultrusion has been successfully used with thermoplastic matrices such as polybutylene terephthalate ("PBT") either by powder impregnation of the glass fiber or by surrounding it with sheet material of the thermoplastic matrix, which is then heated. The pultrusion process is often entirely automated and is typically cost effective for mass production of articles.

As illustrated in FIG. 14A, pultrusion is a continuous manufacturing process for composite materials, wherein source fibers 14A are arranged in rotatable rolls 14B and pulled through a bath of resin 14C and then through a die module 14D so that a profile, shape and uniform cross-section of a resultant pultruded and shaped piece 14E corresponds to the desired blade profile, shape and uniform cross-section of the blade 1, segmented blade 26, or blade segment 28, and wherein the resin 14C of the resultant shaped piece 14E undergoes polymerization during the pultrusion process. The source fibers 14A may comprise a combination of different fibers such as glass, carbon, basalt, aramid and polyester fibers may be used and combined with either thermosetting or thermoplastic resin, including: polyester, vinylester, phenol formaldehyde, epoxy, polyurethane, polypropylene, polyamide and polybutylene terephthalate. Different fiber/resin combinations are available and additives may also be added to or comprise the resin 14C, providing a wide variety of material properties.

As FIG. 14A illustrates, the process of pultrusion is a continuous manufacturing process for creating composite parts having a constant cross-section and a desired length. The term 'pultrusion' as used in this document includes a part made by the pultrusion process.

One or more rolls 14B may comprise mats of woven or combined source fibers 14A. The source fibers 14A are then pulled from a roll 14B into the bath of resin 14C tension provided by a tension roller 14F. Each pultruded piece 14D, e.g. blade 1, blade segment 28 or segmented blade 26 is preferably fully or substantively hardened by the time that the blade segments 26, segmented blade 28 or blade 1 leave the heating die module 14D. Reinforcing fibers such as fibers of glass or carbon of the resin bath 14.3 may be fully saturated ("wetted-out") with a thermosetting resin, usually unsaturated polyester or a vinyl ester.

The source fibers 14A may be compacted to eliminate excess resin 14C from fixation to the source fiber 14A and a resulting resin soaked fiber 14G is then further processed within die module 14D and pulled through the heating die module 14D by a pull mechanism 14H. Heat provided from the die module 14D cures the resin soaked fiber 14G while the pultruded piece 14E is laminated and held in the desired shape by the die module 14D.

The blade 1, segmented blade 26 or blade segment 28 are formed when the pull mechanism 14H causes the heated resin soaked fiber 14G to extend out of through the die module 14D as a fiber-reinforced, shaped polymer shaped piece 1E. It is understood that the polymer shaped piece 14E may be or comprise one or more blade segment 28 of the turbine blade 1 or elements of the turbine blade 1, or an entire turbine blade 1.

Figure 14B:
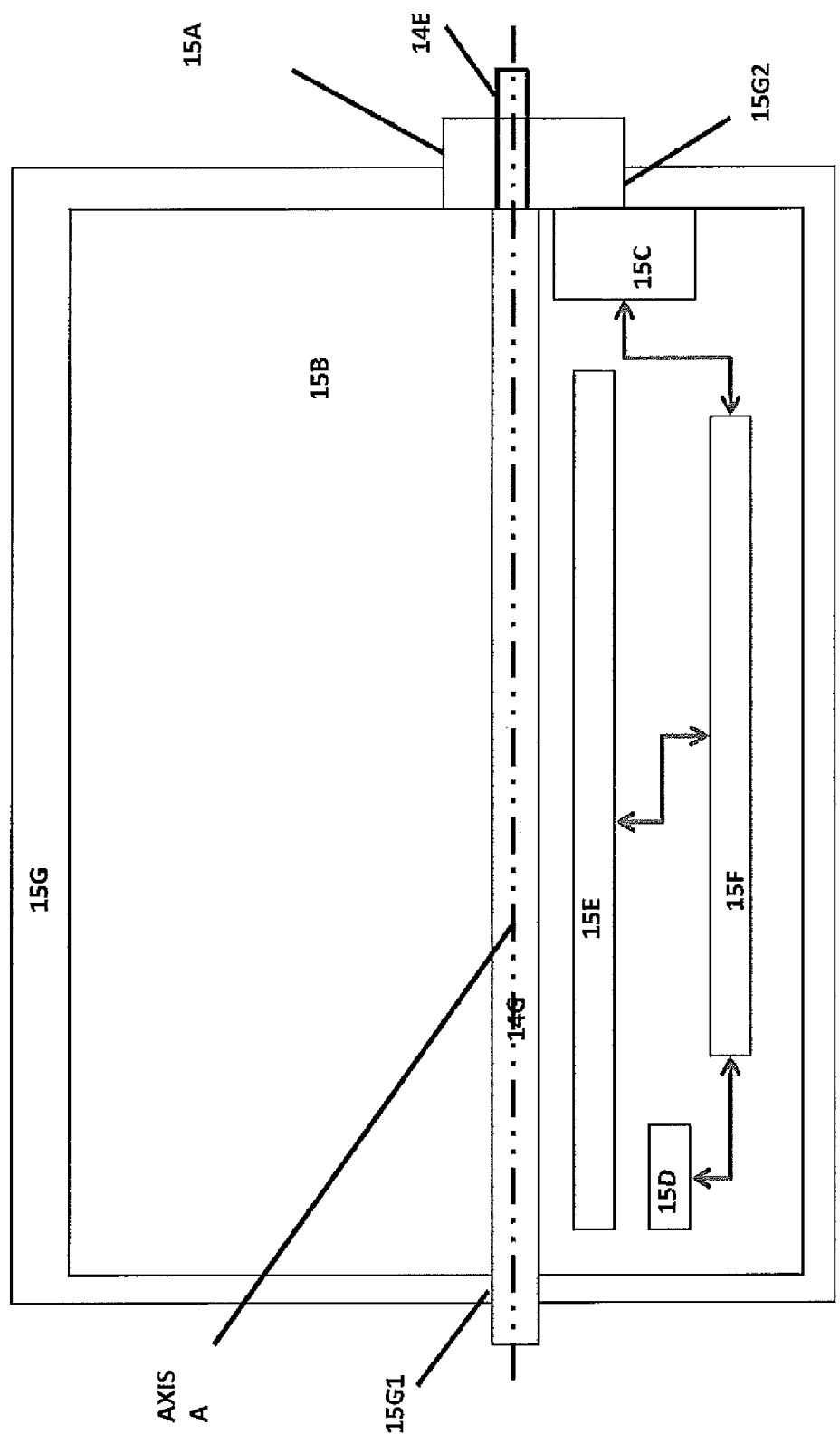
FIG. 14B is a schematic diagram of a heating and motorized die module of FIG. 14A.

FIG. 14B is a schematic diagram of the heated die module 14D. A blade die 15A, presented in a side view orientation defines a cross-sectional die aperture 15B through which one or more blades 1, segmented blades 26 or blade segments 28 may be pultruded. A computer-controlled rotational motor module 15C is mechanically rotatably coupled to the blade die 14B and turns the blade die 15A about a central longitudinal axis A of the segmented blade 26, blade segment 28 or blade 1. A logic controller 15D is communicatively coupled to the rotational motor module 15C and directs the rotational motor module 15C to turn the blade die as the resin soaked fiber 14G is shaped by the blade die 15A and to cause the formation of the pultruded piece 14E, wherein the pultruded piece 14E may alternately comprise a shape forming or comprising one or more segmented blades 26, blade segments 28 or blades 1.

The logic controller 15D is bi-directionally communicatively coupled to the rotational motor module 15C and a digitally controlled heating module 15E through a power and communications bus 15F. The power and communications bus 15F is coupled to an external electrical power source, not shown, and the power and communications bus 15F additionally provides access to electrical power to the logic controller 15D, the rotational motor module 15C and the digitally controlled heating module 15E.

A chamber wall 15F substantively three dimensionally encloses the resin soaked fiber 14G, the power and communications bus 15F, the logic controller 15D, the rotational motor module 15C and the digitally controlled heating module 15E. The chamber wall 15G serves to maintain heat generated from the heating module 15E within the heating die module 14D and allows the resin soaked fabric 14G to pass into the die module 15 through an input chamber aperture 15G1.

The die 15A is removably coupled with an output aperture 15G2 of the chamber wall 15F, whereby the pultruded piece 14E is formed as the die 15A is rotated about the longitudinal axis A by the rotational motor module 15C while the resin soaked fiber 14G is pulled through the die aperture 15b.

FIG. 14C is a front view of the exemplary blade die 15A. The pultruded piece 14E exits from the die aperture 15B as the die 15A is rotated about the axis A by the motor module 15C.

Figure 15:
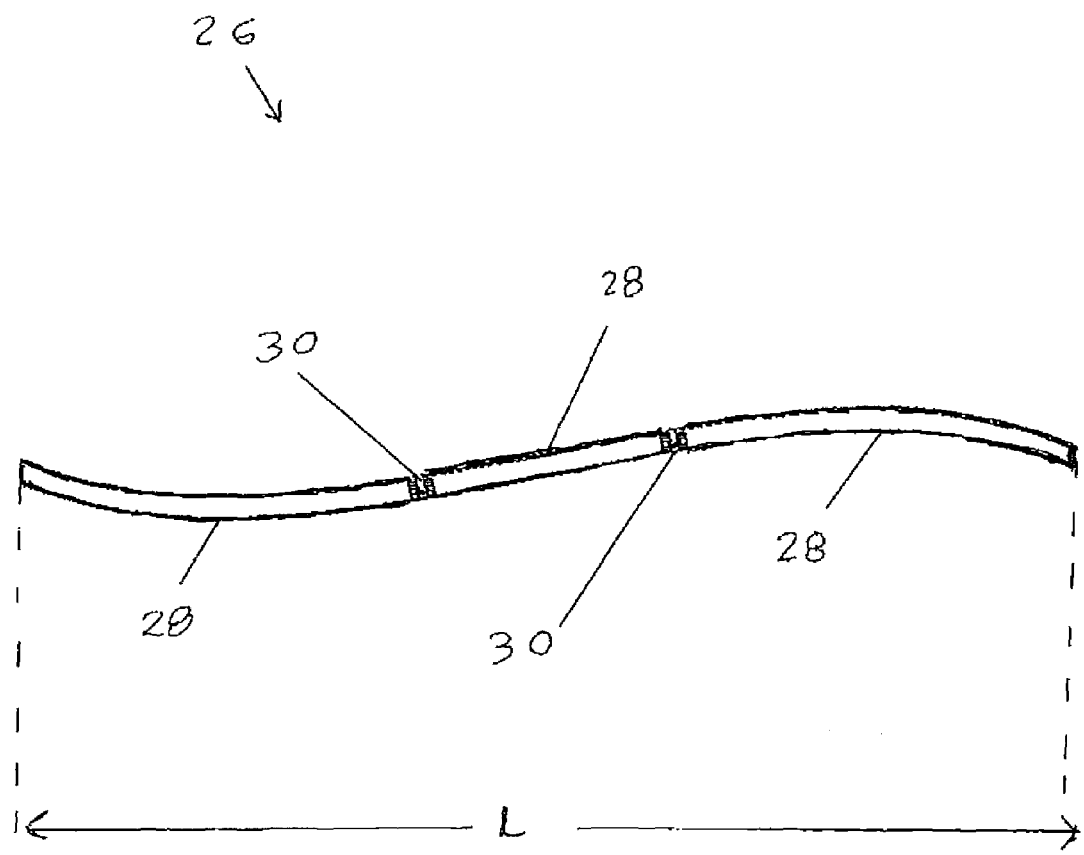
FIG. 15 is an illustration of an alternate segmented blade fabricated and used in accordance with the method of the present invention.

FIG. 15 is an illustration of a segmented blade 26, wherein segmented blade 26 is a first variation of the turbine blade 1 of FIGS. 2 through 4. The segmented blade 26 may optionally be formed with or by two or more substantively identically shaped segments 28 that are joined together to form the unified segmented blade 26 have a linear length L. One or more shaped segments 28 may be adhered by (1.) heat adhesion; (2.) application of an adhesion agent; (3.) friction fit at end fixtures 30; and/or (4.) coupled or adhered by other suitable means or methods known in the art.

It is understood that the blade 28 is preferably shaped such that at each point throughout the length of the blade 28 each increase in radial distance of the blade 28 is equal to the increase in the twist of the blade 28.

It is understood that for a pultrusion process, in order to have a constant blade pitch along the path of the segmented blade 26, the rotation axis of the rotor and the twist axis of the segmented blades 26 would preferably coincide. Also, for each segmented blade 26, along its own blade path, the blade's 26 cross-section will preferably not rotate around this blade path.

Furthermore, in a preferred and optional aspect of the method of the present invention, the blade twist with respect to the blade bend of one or more segmented blades 26 should be constant along the path of the segmented blade 26 itself and the blade cross-section preferably will not rotate around its own blade path, so that each segment of each segmented blade 26 would be identical. In other words, if one were to cut a preferred segmented blade 26 into two or more equal length segments 28, each segment 28 of the preferred segmented blade 26 would be identical.

It is further understood that each shaped segment 28 may be formed by a pultrusion process and extruded through a single or multiple die 15A. Alternatively, one or more shaped segment 28 may be formed of, or comprise, separate elements 28A & 28B, that are each extruded in a pultrusion process by distinguishable and specifically formed dies 15A, wherein the separate elements 28A & 28B may be coupled to form a single blade segment 28.

Figure 16:
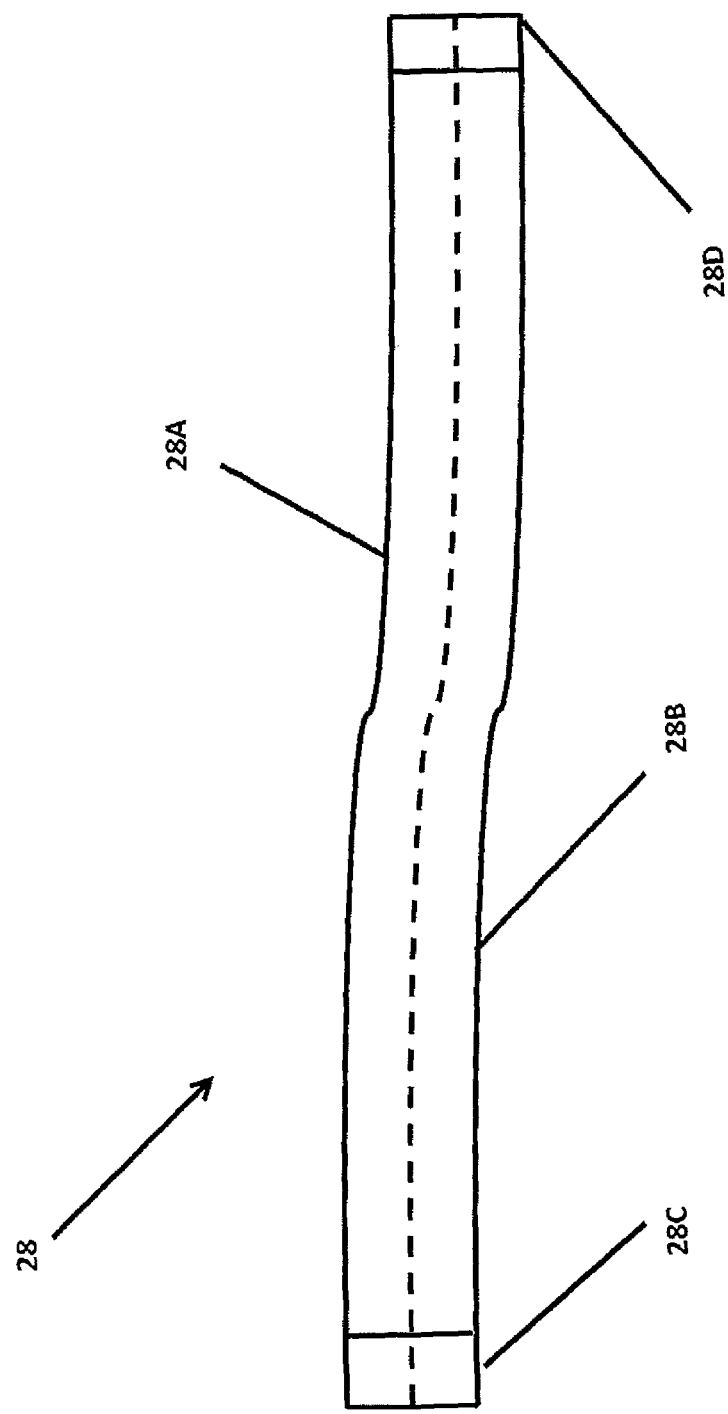
FIG. 16 is a close-up illustration of a segment of the segmented blade of FIG. 15.

FIG. 16 is a partial close-up of a variation of a shaped segment 28 comprising an inner element 28A and an outer element 28B, wherein the inner element 28A is adhered or otherwise coupled with the outer element 28B. The inner element 28A and the external element 28B may by coupled through (a.) heat adhesion; (b.) introduction of an adhesive agent; and/or (c.) coupled or adhered by other suitable means or methods known in the art.

It is understood that inner element 28A may be formed by pultrusion and extruded through a second version of the customized die 15A, and that the outer element 28B may be formed by pultrusion and extruded through a third version of the customized die 15A. It is understood further that in certain other alternate embodiments of the method of the present invention, that the inner element 28A and the outer element 28B may be separately extruded in a pultrusion process through a same but yet alternate customized die 15A.

It is further understood that the optional end fixtures 30 may comprise two complementary and coupled shaped end elements 28C & 28D of adjoining shaped segments 28 that enable friction fitting of two shaped segments 28 to form the segmented blade 26 or portion thereof.

It is understood that the shape and composition of various alternate preferred embodiments of the blade 1, segmented blade 26, and blade segments 28 are selected and altered to attempt to meet performance goals in light of situation specific parameters, expectations and/or ranges of (a.) loads; (b.) desired power output; (c.) fluid or wind environments; (d.) turbine designs or turbine design goals; and/or (e.) external factors or expectations thereof.

Figure 17:
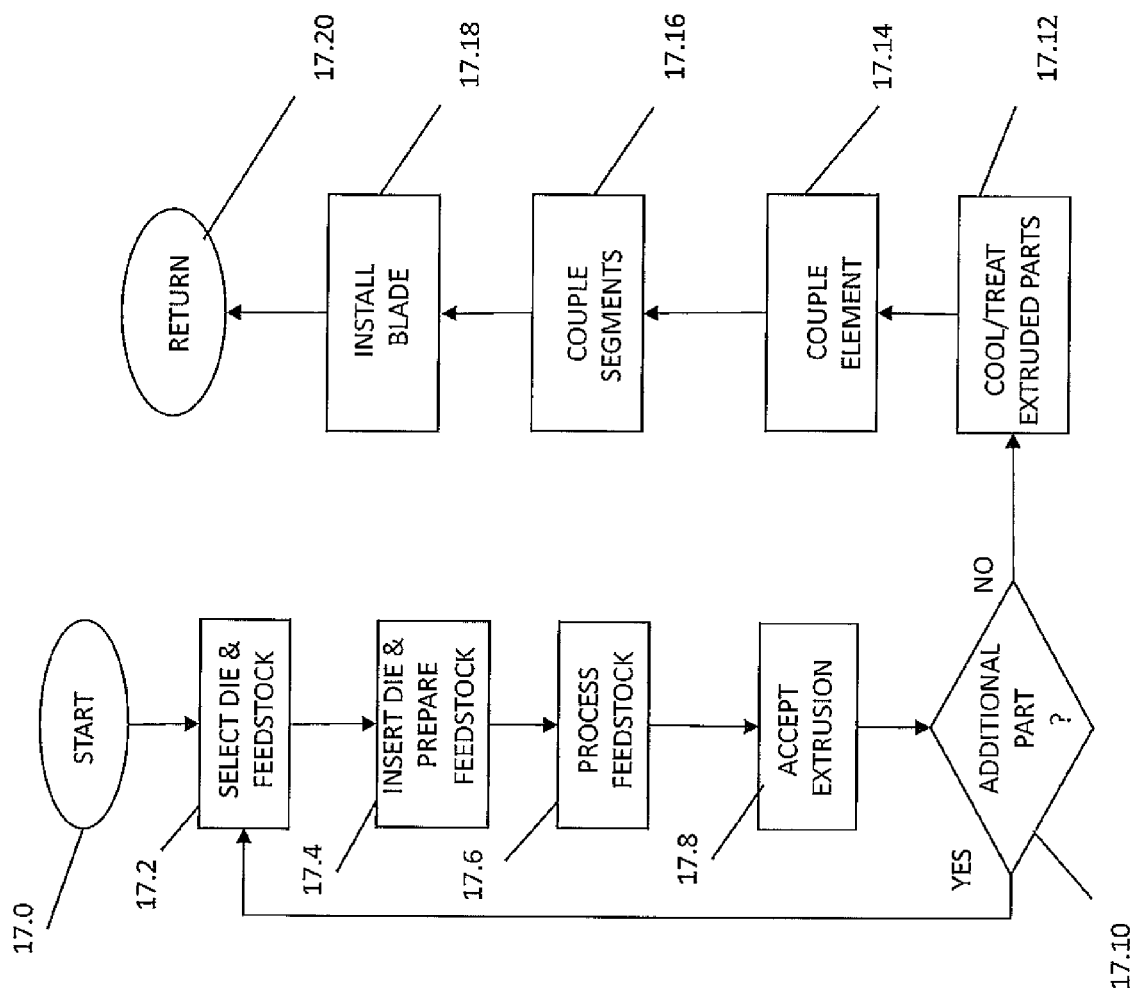
FIG. 17 is a process chart of a fabrication process in accordance with the method of the present invention for fabricating a blade of FIGS. 1 through 5 or 7 through 13, and/or FIGS. 14 through 16.

FIG. 17 is a process chart of a fabrication process in accordance with the method of the present invention for fabricating a blade of FIGS. 1 through 5 or 7 through 13, and/or FIGS. 14A through 16.

Referring now generally to the Figures and particularly to FIG. 17, FIG. 17 presents a method of manufacturing several variations of the present invention and in accordance with alternative and optional aspects of the method of the present invention. In step 17.2 a feedstock, e.g., fibers 14.1, and a pultrusion die 14.5 are selected. The feedstock is provided to, and die is inserted into, the equipment set of FIG. 14 in step 17.4. The pultrusion process is applied in step 17.6 wherein the die 15A may be rotated about the A axis and an extruded object, e.g., the turbine blade 1, the segmented blade 26, a blade segment 28, an inner blade element 28A, or an outer blade element 28B is output and accepted in step 17.10.

When additional objects 28, 28A or 28B are required to form a segmented blade 26, or the pultrusion or fabrication of additional turbine blades 1 and/or segmented blades 26 is desired, the process loop of step 17.10 through 17.2 are repeated from step 17.10.

Pultruded blades 26, blade segments 28, inner blade elements 28A, and/or outer blade elements 28B are optionally cooled or otherwise treated in step 17.12. Any protruded inner blade elements 28A and outer blade elements 28B are coupled in step 17.14. Blade segments 28 may be coupled in step 17.16 to form one or more segmented blades 26. And one or more turbine blades 1 and/or segmented blades 26 are installed into a turbine, or other suitable system, in step 17.18.

One skilled in the art will recognize that the foregoing examples are not to be taken in a limiting sense and are simply illustrative of at least some of the aspects of the present invention.

What is claimed is:

1. A vertical-axis wind turbine, comprising:
   a shaft defining a rotation axis;
   a plurality of substantially rigid blades, each of the plurality of substantially rigid blades defining a lower end and an upper end and a blade path extending from the lower end to the upper end, each of the plurality of substantially rigid blades are circularly offset about the rotation axis relative to the lower end and upper end of the same blade, such that each of the plurality of substantially rigid blades present a constant blade chord and a constant thickness-to-chord ratio along the blade path and wherein each of the plurality of substantially rigid blades conforms to a circular arc helical blade shape such that a blade inclination and a blade curvature are substantially constant along each length of the plurality of substantially rigid blades; and
   a plurality of substantially rigid struts, each of the plurality of substantially rigid struts mechanically coupling at least one of the plurality of substantially rigid blades to the shaft.

2. The vertical-axis wind turbine of claim 1, wherein at least one blade path defines a blade twist and the blade curvature, wherein the blade twist presents the blade inclination and the blade curvature substantially constant along the blade path and wherein a radial distance of the at least one blade path is shorter at the upper end and the lower end and wherein each of the plurality of substantially rigid blades lower and upper end are offset such that the blade inclination is equal or higher than 45° degrees and lower than 90° degrees about the rotation axis, and the blade curvature being a flexion of the blade path in a direction of the rotation axis.

3. The vertical-axis wind turbine of claim 2, wherein each of the plurality of substantially rigid blades has a constant blade twist with respect to the blade curvature and present the constant blade thickness-to-chord ratio along the blade path such that each segment of one of the plurality of substantially rigid blade is substantively identical, whereby at least two equal length segments of each of the plurality of substantially rigid blades are substantively identical in size and shape.

4. The vertical-axis wind turbine of claim 1, wherein a cross-section formed perpendicularly within the blade path of at least one of the plurality of substantially rigid blades in relation to the rotation axis is shaped as an airfoil comprising a plurality of sections, each section having a blade leading edge, a blade trailing edge, a blade chord length, a blade thickness and a blade maximum thickness location, and wherein the blade chord length, the blade thickness and the blade maximum thickness location are substantially constant along the blade path, and wherein each section is angularly and radially offset in respect to an adjacent section.

5. The vertical-axis wind turbine of claim 4, wherein the maximum blade thickness location lays within a range of from 40% to 50% of the blade chord length taken from a leading edge of the at least one of the plurality of substantially rigid blades.

6. The vertical-axis wind turbine of claim 1, wherein a blade cross-section is symmetrical about a line residing within each of the plurality of substantially rigid blades and forming a shortest distance between a blade leading edge and a blade trailing edge and whereby a blade profile, the constant blade inclination and blade curvature induce a laminar airflow condition on an upper surface of the blade.

7. The vertical-axis wind turbine of claim 1, wherein 1 radial distance from the rotation axis to the blade path varies along the blade path and the blade path approximates a circular arc, wherein the radial distance approximately at a middle of a generating line is longer than at the lower end and at the upper end.

8. The vertical-axis wind turbine of claim 1, wherein a radial distance from the rotation axis to the blade path approximates a circular arc helical blade shape.

9. The vertical-axis wind turbine of claim 1, wherein at least a first radial distance at the upper end or the lower end of at least one of the plurality of substantially rigid blades is shorter than a second radial distance formed at a center of the blade path and wherein in a center of curvature of the at least one of the plurality of substantially rigid blades lies along the axis of rotation.

10. The vertical-axis wind turbine of claim 1, wherein at least one of the upper and lower ends of each of the plurality of substantially rigid blades is coupled with the shaft.

11. The vertical-axis wind turbine of claim 1, wherein the plurality of substantially rigid blades are connected to a rotating mechanism at either the upper or lower end or at a center.

12. The vertical-axis wind turbine of claim 1, wherein a strut airfoil is contained within a plane perpendicular to the axis of rotation to minimize a perturbation to a wind flow and a strut maximum thickness location lays within a range from 40% to 50% of a strut chord length taken from a leading edge of the at least one of the plurality of substantially rigid blades and adapted to induce a laminar airflow on an upper surface of the strut airfoil.

13. The vertical-axis wind turbine of claim 1, wherein a strut cross-section of at least one of the plurality of substantially rigid struts is symmetrical about a line residing within a strut path forming a shortest distance between a strut leading edge and a strut trailing edge of the at least one of the plurality of substantially rigid struts, whereby the at least one of the plurality of substantially rigid struts is adapted for inducing laminar airflow conditions on an upper surface of the at least one of the plurality of substantially rigid struts strut.

* * * * *